July 9, 1968  E. E. BEAUBIEN  3,391,487

NOISEMAKER AND SAFETY DEVICE

Filed Feb. 23, 1966

INVENTOR
EVERETT E. BEAUBIEN

BY Peter M. Dunning

ATTORNEY

United States Patent Office 3,391,487
Patented July 9, 1968

3,391,487
NOISEMAKER AND SAFETY DEVICE
Everett E. Beaubien, 199 Thompson Ave. E.,
St. Paul, Minn. 55118
Filed Feb. 23, 1966, Ser. No. 529,573
9 Claims. (Cl. 46—178)

This invention relates to a noisemaker and safety device particularly adapted for use with bicycles having spoked wheels.

Various types of noisemakers and safety devices have been devised for the youth who engage in riding bicycles. In many instances these devices are merely intertwined through the spokes of the wheel. In this manner, they create a pin wheel effect. However, in general these devices are quite bulky and constitute mere attachments which soon disintegrate from the whirling of the wheel. Further, these devices have proven to be quite time consuming insofar as their placement upon the wheels are concerned. Further, their effect as noisemakers is severely limited.

The present invention encompasses a noisemaker and safety device having at least one spinner element rotatable with the passage of air as the wheel rotates to create an unusual sound.

It is an object of the present invention to provide a noisemaker and safety device positioned in a flexible frame having means on the frame to readily attach the device to the spokes of the wheel.

It is a further object of the present invention to provide a noisemaker which is adapted to be used with wheels of different diameters without necessity of modification of the device. I have found that complete circles of the device may be placed upon the wheel and when the devices are of different colors quite a spectacle is created as well as a considerable noise. Nine units of the device will provide a complete circle on one wheel and these devices may be positioned in a variety of spacings to create unusual effects.

It is a further object of the present invention to provide a noisemaker and safety device wherein a plurality of rotatable spinner elements may be rotatably fixed to provide differences in appearance, sound, and if desired, pitch.

It is a further object of the present invention to provide a noisemaker which may be inexpensively manufactured and possessed of brilliant or reflective coloration so as to be seen in the dark to add protection to the bicycle rider. Additionally, the device may be inexpensively manufactured and is unusually decorative.

It is a further object of the present invention to provide a noisemaker which may be readily fastened to the wheel and is quickly detached whenever desired.

It is a further object of the present invention to provide a noisemaker for attachment to a wheel intermediate adjacent spokes so as to be spaced from engagement with the frame to which the wheel is attached.

In the preferred embodiment I provide a generally elongated frame having ears at opposed ends to secure the frame of the device to the wheel. The frame is flexible as are the ears. The ears are normally independently flexible of the frame. At least one spinner element has leading and trailing edges oppositely bowed to extend out of the plane of the intermediate portions of the spinner element.

Transverse pivotal supports are provided on opposite sides of the spinner element and are rotatably secured in enlarged recesses in the frame so as to enable the spinner element to move in restricted relation forwardly and rearwardly, laterally and angularly, the movement inducing variances in the pitch and noise as the spinner rotates, and in addition the positioning of the devices serving to provide an unusually attractive display.

It will be appreciated that the devices are capable of being hooked together to provide this attractive and novel protective device.

These and other objects and particular advantages will be more particularly described in detail when taken in conjunction with the accompanying drawings in which.

Figure 1:
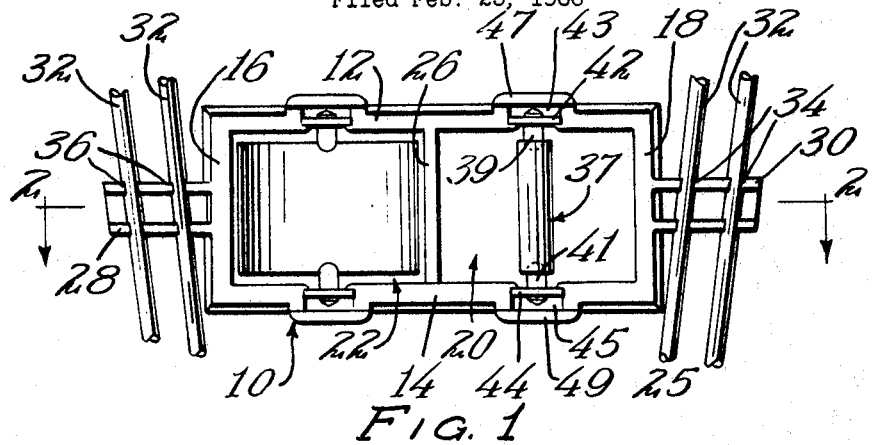
FIGURE 1 is a plan view of the noisemaker secured to portions of wheel spokes.

The noisemaker is best illustrated in FIGURE 1 comprising a frame generally numbered 10 having opposed side walls 12 and 14 and end walls 16 and 18 defining an enlarged aperture. The aperture 20 may be divided into generally equal portions 22 and 24 by a spacer bar 26.

In the preferred construction the frame 10 is generally elongated and is highly flexible to enable the frame to be bent to assume a generally arcuate form. The resilient frame is secured to the wheel of a bicycle for example, by means of ears 28 and 30 which are also resilient. To accommodate spokes 32 of a wheel which radiate from a hub (not shown) I provide angled recesses or slots in each ear 28 and 30 to accommodate the spokes 32. It is obvious that a plurality of slots may be provided in each ear depending upon the length of the ear and the number of spokes desired to be engaged in the slots, or on the other hand a single slot in each ear will hold the noisemaker attached to two spaced apart spokes. As the spokes radiate from the hub of the wheel which is not shown, the slots similarly have to be angled to accommodate this angle of radiation of the spokes.

The frame and ears may be made of any desired material, but I have found that material such as plastic, for example, as quite effective for my purpose as they may accommodate a variety of colors, and in addition have the necessary resilience so that they may be readily bent to accommodate the spokes to engage in the slots in the ears. However, it is further apparent that light metal, rubber, and other suitable synthetics could be used.

In the aperture 20 I provide a spinner element having oppositely extending leading and trailing edges 38 and 40, the spinner element being generally numbered 37. The spinner element is of a size and shape to substantially fill the aperture in which it is to rotate. Where a plurality of apertures are provided such as is shown in FIGURE 1, similarly a plurality of spinner elements are provided.

In the preferred construction, the spinner element is wave-light in configuration with the oppositely out turned ends 38 and 40 projecting equal distances from the intermediate portion of the spinner.

Opposed pivots 39 and 41 extend from opposite sides of the spinner blade, the pivots being essentially stubs. The stub pivots are received in sockets 43 and 45 in opposite sides of the frame 10. The sockets 43 and 45 are preferably of greater diameter than the stub pivots and also of greater depth in order to enable the spinner 37 to move laterally, longitudinally, and angularly. Suitable stop means are provided such as the portions of the frame 47 and 49 as many be clearly seen in FIGURE 5 to prevent undue lateral movement of the spinner element 37.

It will thus be seen that rotation of the wheel to which the spinner element is secured will cause the leading and trailing edges of the spinner element to catch passing air to rotate the spinner element. As the element rotates, it will move in a variation of directions and angles because of its loosely held pivotal relation to the frame thereby creating a variety of sounds. As the spinner element rotates more rapidly, the pitch of the sound will similarly change.

The noisemaker may be made in a variety of colors or combinations of colors in order to provide a very attractive ornamental device as well as an object capable of making an unusual sound.

Figure 2:
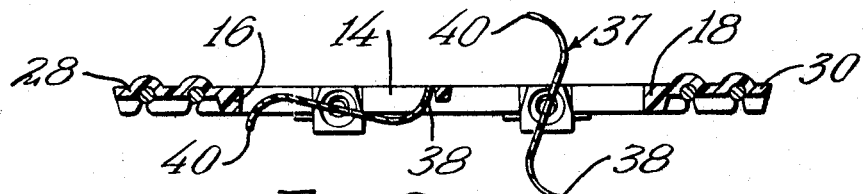
FIGURE 2 is a section taken along the lines 2—2 of FIGURE 1.
Figure 3:
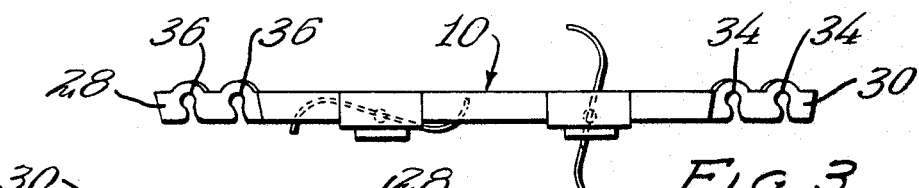
FIGURE 3 is a top plan view of the noisemaker shown in FIGURE 1.

As will be understood from the views shown in FIGURES 2 and 3, the spokes radiating from the hub are quite close together adjacent the hub and are progressively further apart as they extend further away from the hub. Accordingly, the noisemaker may be secured to a plurality of spokes adajcent the hub or merely to two radiating spokes is secured some distance from the hub. As the ears 28 and 30 are flexible both independently and in relation to the frame 10, the ears may readily accommodate the angle at which the spokes extend. Further, both the ears and the frame portion may be bent or curved to readily accommodate the distance between adjacent spokes. In some instances, this will result in the frame having a gentle arcuate curve.

Further, it will be understood that the positioning of the spinner element between adjacent spokes and in generally the same plane as the spokes, removes the spinner element from the possibility of engagement with the portions of the vehicle frame to which the wheel is secured. For example, it will be understood that the fork of a bicycle extends on both sides of a bicycle wheel, and in such an instance the noisemaker would be in spaced relation to the arms of the fork without any danger of becoming entangled for engaging the fork arms when the wheel rotates.

Figure 4:
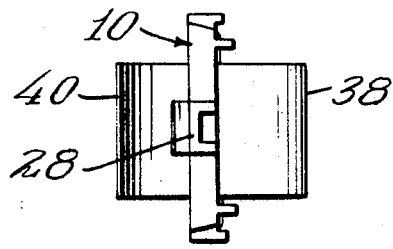
FIGURE 4 is an end elevation of the noisemaker.
Figure 5:
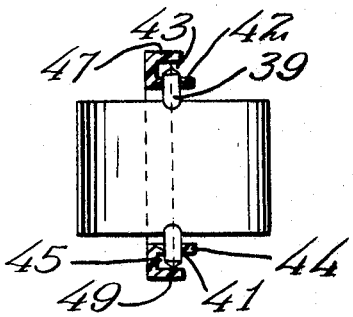
FIGURE 5 is a view showing the pivot and socket relationship of the spinner element and frame.

As may be clearly seen in FIGURE 4 and FIGURE 5, the spinner blade is held in spaced apart relation to the frame by the stubs 39 and 41. While the depth of the sockets 43 and 45 are sufficient to permit transverse movement of the spinner element, such transverse movement is limited by the stop portions of the frame. Accordingly, the spinner element may move transversely, and in addition pivot to various angles while rotating either slowly or rapidly depending upon the speed of the air trapped by the edges of the spinner.

It will be understood that a variety of different aperture shapes may be provided, but I have illustrated a generally rectangular configuration for purposes of description. The portions of the frame outside of the aperture may be of a variety of shapes in order to provide different attractive appearances. As this is believed obvious, no further description is believed necessary.

The frame may be of any desired depth to provide sufficient strength to accommodate the spinner which it holds. I have found that a frame thickness of three-sixteenths inch provides a frame which will prove to be quite sturdy in actual use. The blade of the spinner may be as thin as one-sixteenth of an inch, and may be thinner if desired to produce different pitch. Similarly, it will be obvious to produce blades having edges which are fluted or otherwise modified to provide changes in sound.

As may be clearly seen in FIGURES 1 and 5, in the preferred construction sockets 43 and 45 are provided in the frame to receive the stubs 41 and 43. Flexible bearing walls 42 and 44 are provided at the openings of the socket, the bearing walls having openings of relatively large diameter to receive the pivot stubs. This particular construction enables the frame walls to be distorted in order to insert the spinner element in assembly. Further, it permits changing spinner elements whenever such might be necessitated.

FIGURE 4 illustrates the position of the spinner element when rotating in relation to the frame 10.

As is apparent, the spinner element should conform in general configuration to the aperture which it occupies. Additionally, it is obvious to use combinations of material such as steel for the spinner blades in cooperation with nylon rollers or pivots, but these modifications are obvious.

Figure 6:
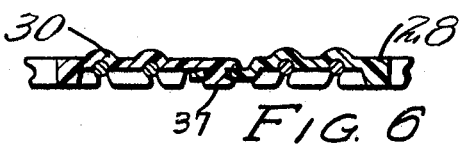
FIGURE 6 is a section taken through two end connected safety devices.
Figure 7:
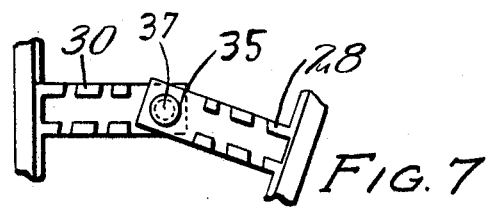
FIGURE 7 is an elevational view of two end connected safety devices secured in pivot and socket relation.

FIGURE 6 and FIGURE 7 illustrate a modification in a pivot and socket connection. An upstanding pivot member 37 at generally right angles to the frame of the safety device is provided at one end of the frame. The pivot 37 is adapted to be pivotally secured in a socket 35 to a similar safety device. In the modified structure illustrated, one end of the frame is provided with the pivot 37 and the other end of the frame of the safety device is provided with a socket in a manner which will be readily understood.

In accordance with the Patent Office statutes, I have described the principles of construction and operation of my improvement in "Noisemaker," and while I have endeavored to set forth the best embodiment thereof, I desire to have it understood that changes may be made within the scope of the following claims without departing from the spirit of my invention.

I claim:
1. A noisemaker for attachment to a spoked wheel comprising:
   (a) a flexible frame having an enlarged aperture therein,
   (b) means at opposite ends of said frame to secure said frame between two adjacent spokes of said spoked wheel,
   (c) at least one spinner element rotatably secured in said body aperture,
   (d) said element having oppositely outturned leading and trailing edges adapted to intercept air flowing by said spoked wheel to induce rotation of said element.

2. The structure of claim 1 and in which said spinner element is of a size and shape to substantially correspond to said body aperture.

3. The structure of claim 1 and in which said frame defining said enlarged aperture includes a pair of opposed sockets intermediate said ends, said spinner element having aligned oppositely extending pivot members, said sockets being of greater diameter than said pivot members in which said pivot members are registered, whereby said pivot members are adapted to freely revolve and rotate in said sockets.

4. The structure of claim 3 and in which said spinner element is adapted to move restrictively laterally and angularly.

5. The structure of claim 1 and in which said enlarged aperture is generally elongated and rectangular in plan.

6. The structure of claim 5 and which includes a plurality of spinner elements, each said element having aligned oppositely extending pivot members, said frame including opposed sockets intermediate the ends of said frame in which said pivot members are registered.

7. The structure of claim 1 and in which said means includes flexible ears having transverse slots adapted to engage the spokes of a wheel.

8. The structure of claim 7 and in which said frame is adapted to be secured in bowed relation to a said wheel.

9. The structure of claim 1 and in which said frame includes a pivot post generally normal to said frame adjacent one end of said frame and a socket corresponding in diameter to said pivot post at the opposite end of said frame whereby a plurality of noisemakers may be secured end to end.

References Cited

UNITED STATES PATENTS 2,489,107  11/1949  Rheingold et al. _____ 46—51
3,221,440  12/1965  Gutierez _____ 46—53 X LOUIS G. MANCENE, *Primary Examiner.*

R. F. CUTTING, *Assistant Examiner.*